May 26, 1936.  E. A. STALKER  2,041,790

AIRCRAFT

Original Filed May 17, 1934   7 Sheets-Sheet 1

INVENTOR
Edward A. Stalker

May 26, 1936. E. A. STALKER 2,041,790
AIRCRAFT
Original Filed May 17, 1934 7 Sheets-Sheet 2

INVENTOR
Edward A. Stalker

May 26, 1936.   E. A. STALKER   2,041,790
AIRCRAFT
Original Filed May 17, 1934   7 Sheets-Sheet 3

INVENTOR
Edward A. Stalker

May 26, 1936.  E. A. STALKER  2,041,790
AIRCRAFT
Original Filed May 17, 1934   7 Sheets—Sheet 4

INVENTOR
Edward A. Stalker

May 26, 1936.  E. A. STALKER  2,041,790
AIRCRAFT
Original Filed May 17, 1934   7 Sheets-Sheet 5

INVENTOR
Edward A. Stalker

May 26, 1936.  E. A. STALKER  2,041,790
AIRCRAFT
Original Filed May 17, 1934  7 Sheets-Sheet 6

INVENTOR
Edward A. Stalker

May 26, 1936.     E. A. STALKER     2,041,790
AIRCRAFT
Original Filed May 17, 1934     7 Sheets—Sheet 7

FIG. 23     $\Gamma = \int_s V_1 ds$

FIG. 24

INVENTOR
Edward A. Stalker

Patented May 26, 1936

2,041,790

UNITED STATES PATENT OFFICE 2,041,790

AIRCRAFT

Edward A. Stalker, Ann Arbor, Mich.

Application May 17, 1934, Serial No. 726,111
Renewed November 29, 1935

29 Claims. (Cl. 244—12)

This invention relates to aircraft and particularly to a means of utilizing wings whose lifting ability is augmented by boundary layer energization, and to a means of propulsion utilizing the boundary layer. This application contains subject matter common to those filed November 7, 1931 and May 22, 1933, Serial Numbers 573,651 and 672,194, respectively. This application also contains some subject matter similar to the applications Serial Numbers 726,112 and 726,113.

One object of this invention is to provide in an aircraft means for efficient propulsion with the means of blowing housed within the aircraft.

Another object is to provide means so to relate the wing, having boundary layer energization to create a high lifting capacity for landing, to the means of propulsion that both function to produce an especially safe and efficient flying machine for all attitudes of flight.

Yet another object is to provide a wing with a wing section to obtain a high lift by boundary layer energization, and to suppress the undesirable drag that accompanies such a wing by means which cooperate with the propulsive system through the energization of the boundary layer.

Still another object is to provide a means of reducing the lift of the wings without a bodily rotation of the wing—by creating artificially a negative circulation about the wing.

Other objects will appear from the appended drawings and descriptions.

I attain the above objects by the means illustrated in the accompanying drawings in which—

Figure 4a is a like section along line 4a—4a of Figure 3a;

Figure 6 is a vertical cross section similar to Figure 5 and shows an alternative form of the lower surface slot;

Figure 7 is a fragmentary transverse cross section along the line 7—7 in Figure 4;

Figure 8 is a top plan view of the blower;

Figure 9 is a side elevation of the blower;

Figure 10 is a cross section of the preferred wing along the line 10—10 in Figure 3a;

Figure 11 is a cross section along the line 11—11 in Figure 3a;

Figure 16 is a fragmentary horizontal section along line 16—16 in Figure 4 or 4a;

Some explanation of the theory underlying the objectives and their accomplishment is given before describing the construction of the invention in more detail.

I am aware that it has been proposed that the airplane propeller be enclosed within the fuselage of the aircraft. However, no such scheme has proved successful because of certain inherent defects which have not been remedied and for which I believe it has not been appreciated that a remedy could be devised. The principal defect or difficulty arises from the curtailment of the propeller diameter, or more fundamentally, of the mass of air or other fluid handled by the propelling device. Where an airscrew is used, the housing of it reduces the diameter very greatly so that the mass of air is restricted. Propulsion is then possible only by giving a high velocity to the air flowing through the propeller. Since thrust is the product of mass and velocity while the energy is one-half the product of mass and the square of the velocity, it follows that the obtainment of thrust by a high velocity is very extravagant of energy. A high energy consumption means a high fuel load which directly reduces the useful load for a given range of flight.

I place the propulsive mechanism within the fuselage but I mitigate the undesirable features by the manner in which I induct and discharge the air necessary to form the propulsive jet and by the proper proportioning and location of the inlet and exit openings. They are arranged to utilize the boundary layer of air in such a manner that the resistance of the aircraft is reduced enough to make up for the curtailment of the jet mass. In other words I proceed on the theory that a reduction in resistance is more important than an increase of thrust. The former does not consume fuel but the latter does.

When fluid flows across a body the velocity at the surface of the body is zero and it is some distance out from the body that the full velocity of the local stream is attained. If the body is curved the loss in energy due to friction along the forward portion is such that when the flow reaches the locality where the body begins to contract in cross sectional area the flow leaves the body and a turbulent wake appears which increases the drag of the body greatly. The layer of air retarded by friction is called the boundary layer. If sufficient energy is added to the boundary layer it will not leave the surface but will follow smoothly along it with a consequent reduction in drag. The amount of energy needed is small in comparison with the reduction of drag. The process is called the energization of the boundary layer.

The boundary layer may be energized either by blowing along the surface rearward so as to accelerate the boundary layer, or by drawing the boundary layer into the body. In both cases energy is added to the layer and in both cases the layer is suppressed.

Only where there is a contraction in the cross section of the body, or where a surface is curved away from the flow is boundary layer energization useful. On a flat surface curving toward the flow there is no reduced pressure area to cooperate with the loss of energy due to rubbing and thereby cause the flow to separate from the body. A jet discharged along a flat pressure surface will not reduce the drag but will actually increase it if the jet speed is higher than the relative wind because of the added friction arising from the greater velocity of the jet. Since aerodynamic bodies have sides which become nearly flat to the rear of a point two-thirds of the length back from the nose or forward end, the slot or opening should be ahead of this point.

It is by the proper use of the reduction in drag due to boundary layer energization that I succeed in making it possible to house the propulsive device within the aircraft. The correct procedure is to induct the boundary layer at the localities where flow separation will be prevented and discharge it at other localities for the same purpose. Then in addition to creating a thrust the jet will decrease the resistance in two ways.

Great care must be exercised in proportioning the jet cross section for the reduction of drag due to energizing the boundary layer may be entirely dissipated if the jet velocity is too high as it will be if the jet cross section is too small. A high jet velocity increases the friction on the body surface and hence itself increases the drag. It is best to use the inlet area as a measure of the jet cross section because air must be inducted at the pressure and temperature prevailing in the atmospheric air about the aircraft and hence it is a definite volume and not subject to manipulation as by heating. Any degree of heating might subsequently be used and the indefiniteness of the amount would lead to indeterminateness in the succeeding equations. On the other hand heating the air after it is measured at the inlet area will not invalidate the equations considered as stating the minimum inlet area to provide the requisite mass of air. This is true because heating the air will increase the velocity of discharge and the equations state a value not to be exceeded. I proportion the inlet area so that the jet velocity is optimum to obtain the greatest reduction in drag. According to the theory of this invention $T_r$, the thrust required for the airplane is $$T_r = \frac{C_D}{C_L}W - C_{DP}\frac{\rho}{2}AV^2 6t\left(\frac{V_j-V}{V} - \frac{V_j^2-V^2}{16V^2}\right) \quad (1)$$

where
 $C_D$ = drag coefficient
 $C_{DP}$ = profile drag coefficient
 $C_L$ = lift coefficient
 $W$ = weight of the aircraft
 $\rho$ = mass density of the air
 $A$ = area of wings
 $V_j$ = velocity of jet
 $V$ = velocity of the aircraft
 $t$ = thickness of wing as a fraction of the mean aerodynamic chord.

It is well known in aerodynamic theory that $$C_D = C_{DP} + \frac{C_L^2}{\pi R} = C_{DP} + \frac{C_L^2 A}{\pi(kS)^2} \quad (2)$$

where R is the aerodynamic aspect ratio of the wings and $\pi$ has its usual significance and value of 3.14. The first term $C_{DP}$ is called the profile drag coefficient and depends chiefly on the viscosity of the air and the wing section; the second term $$\frac{C_L^2}{\pi R}$$

is called the induced drag. Since aspect ratio is $$\frac{S^2}{A}$$

where S is the span, the induced drag may be written as the last term with a factor $k$ to provide for various plan forms and wing arrangements. The numerical factor for $k$, called the "span factor", may be found in aeronautical handbooks and design books. For a monoplane of elliptic plan form $k=1$ and for tapered or rectangular plan form $k$ is very closely 1, within about 5 per cent.

As regards the first term on the right of Equation (1) the required thrust will be a minimum when $$\frac{C_D}{C_L}$$

is a minimum. It is desirable, however, that the airplane should be able to fly at the maximum lift coefficient. The value of maximum $C_L$ depends on the amount of boundary layer energization as, for instance, on the number of slots.

Using Equation (2), Equation (1) may be written for flight at maximum coefficient as $$T_r = \left(C_{DP} + \frac{C_{L\,max}^2}{\pi R}\right)\frac{\rho}{2}AV^2 - 6tC_{DP}\frac{\rho}{2}AV^2\left(\frac{V_j-V}{V} - \frac{V_j^2-V^2}{4V^2}\right) \quad (3)$$

There is a jet velocity for which $T_r$ will be a minimum which may be found by differentiating Equation (3) with respect to $V_j$ and equating to zero.

$$\frac{dT}{dV_j} = 6tC_{DP}\frac{\rho}{2}AV^2\left(\frac{1}{V} - \frac{V_j}{2V^2}\right) = 0$$

$$V_j = 2V \quad (4)$$

The thrust available from the jet is $$T_a = \frac{\rho}{2}A_j(V_j^2 - V^2) \quad (5)$$

where $A_j$ is the cross sectional area of the jet.

The thrust available must equal the thrust required so $$A_j = \frac{\left(C_{DP} + \frac{C_{L\,max}^2}{\pi R}\right)AV^2}{V_j^2 - V^2} - \frac{6tC_{DP}AV}{V_j + V}\left(1 - \frac{V+V_j}{4V}\right) \quad (6)$$

and since $V_j = 2V$ $$A_j = A\left\{\frac{C_{DP}}{3} + \frac{C_{L\,max}^2}{3\pi R} - \frac{t}{2}C_{DP}\right\} \quad (7)$$

The value of $C_{DP}$ is a function of the wing section maximum thickness expressed as a fraction $t$ of the chord and the fuselage cross section according to well known theory as $$C_{DP} = (0.01 + 0.01t + 0.1t^2 + 0.02C_L^2) + 0.21\frac{A_f}{A} \quad (8)$$

where $A_f$ is the area of the largest cross section of the fuselage (if there is one) transverse to the longitudinal axis.

For values of $C_L$ near the maximum value of the ratio $C_L/C_D$ or values near minimum drag, the term $0.02 C_L^2$ is ordinarily neglected but near maximum $C_L$ this term is important and should be retained. Therefore for $C_{L\,max}$ $$A_j = A\left\{\frac{C_{L\,max}^2}{3\pi R} + \left[0.01 + 0.01t + 0.1t^2 + 0.02C_{L\,max}^2 + 0.21\frac{A_f}{A}\right]\left(\frac{1}{3} - \frac{t}{2}\right)\right\} \quad (9)$$

This is the minimum area that will insure level flight at the maximum lift coefficient with maximum efficiency. A smaller area will involve such large jet velocities that the reduction in drag due to boundary layer energization will be reduced to negligible magnitude or annihilated entirely.

It is to be understood that the relation between $V_j$ and $V$ applies to the average condition of flow and that it is possible to discharge some of the air at a different velocity than $2V$ without materially affecting the over-all effectiveness of propulsion.

For the condition of $V_j = 2V$ Equation (3) becomes $$T_r = \left[C_{DP} + \frac{C_{L\,max}^2}{\pi R} - \frac{3t}{2}C_{DP}\right]\frac{\rho}{2}AV^2 = \left[\frac{C_{L\,max}^2}{\pi R} + C_{DP}\left(1 - \frac{3t}{2}\right)\right]\frac{\rho}{2}AV^2 \quad (10)$$

For a given airplane design only so much thrust will be available from the given engine and $R$ and $t$ must be selected to give the best results. Since $T_r = $ constant, $$\frac{dT_r}{dR} = 0$$

and the derivative of Equation (10) with respect to $R$ produces $$\frac{dt}{dR} = \frac{C_{L\,max}^2}{R^2\left[(0.01 + 0.05t - 0.3t^2) - \frac{3}{2}\left(0.01 + 0.1t + 0.1t^2 + 0.02(0.9 + 9h)^2 + 0.21\frac{A_f}{A}\right)\right]} \quad (11)$$

from which it is seen that the rate at which $t$ should change with $R$ is inversely proportional to $R^2 t^2$ taking only the highest powers. In any case the rate is a function of the product $Rt$.

From Equation (11) it appears that the thrust required decreases with an increase in aspect ratio $R$ and increases with an increase in wing thickness since $C_{DP}$ is a function of the thickness ratio $t$. Because of the handicap of a small propeller or jet diameter the device is not suitable for small values of $R$ because the boundary layer energization does not affect the induced drag but only the profile drag as shown by Equation (1). Thus for certain low values of $R$ no possible amount of reduction in profile drag will compensate for the high drag due to a low value of $R$. There is therefore a value of the product $Rt$ below which it is impracticable to go. I find that $Rt$ should be larger than 0.50 and the only upper limit is set by $t = 1$ and the greatest aspect ratio that may be built for an economical weight. At the present this aspect ratio is of the order of 25 but refinements in materials may extend this limit.

Equation (9) gives the optimum value for the area of the inlet of the jet. $C_{L\,max}$ may have a numerical value anywhere between 0.9 (for a flat plate) to $4\pi$ depending on the amount of boundary layer energization. It is well known in aerodynamics that $C_{L\,max}$ has a theoretical limit of $4\pi$. A more practicable lower limit is 1.2 since an airfoil section will always be used. Corresponding to these limits of $C_{L\,max}$ are the values of $A_j$, namely—

$$A_{j1} = A\left\{\frac{1.44}{3\pi R} + \left[0.0388 + 0.01t + 0.1t^2 + 0.21\frac{A_f}{A}\right]\left(\frac{1}{3} - \frac{t}{2}\right)\right\} \quad (11a)$$

and $$A_{j2} = A\left\{\frac{16\pi}{3R} + \left[3.19 + 0.01t + 0.1t^2 + 0.21\frac{A_f}{A}\right]\left(\frac{1}{3} - \frac{t}{2}\right)\right\} \quad (11b)$$

respectively. At first sight it may appear improper that $A_{j2}$ may exceed the wing area $A$ as shown by equation (11b) for a low aspect ratio; but it must be remembered that the wing has an upper and lower surface and a fuselage surface if $A_f$ is not zero.

For $$R = 6, \frac{A_f}{F} = 0.10$$

and $t = 0.15$, the value of $A_{j1}$ becomes 0.0413.

Although the proposal has been made to blow propulsive jets out the surfaces of the wing, the idea of utilizing the energization of the boundary layer in combination with propulsion so as to improve it is new. Because the effective use of the boundary layer for this purpose calls for specific proportions, the mere blowing of air or other fluid does not constitute this idea. The jet inlet area and the location of the inlet and exit are the pertinent points and are herein embodied in constructions never before proposed or employed.

In addition to preventing the main relative flow of air (the atmosphere) from separating from the body, provision must also be made to prevent the separation of the jets themselves from the body. Thus in a fuselage which is curved along an appreciable length it is desirable to eject a fluid jet near the maximum cross section and a second jet at an appreciable distance to the rear of the first jet. The first jet expends energy in rubbing on the surface between the jets and is reenergized by the second jet. Thus the first jet is prevented from leaving the surface when its energy has fallen to a low value. In an elongated body like a fuselage a plurality of jets spaced apart is very important for efficiency.

The jets should be emitted as sheets of fluid which bathe the whole surface of the fuselage. The fuselage openings should encircle the fuselage or extend over a major portion of the perimeter of a cross section. The jets should not be just on one side even though this side be curved, because the jet will augment the low pressure region and further encourage a flow from the other sides into the low pressure region at the locality of the jet. Hence there will be a spiral flow about the body which will increase the body resistance. This may be comprehended in one instance in that the flow will have a longer path in contact with the body.

There is also another limitation on the upper limit to the magnitude of the jet velocity. As the speed of the jet approaches the velocity of sound it will not follow the contour of a surface curving away from the flow. This effect becomes extremely marked even for small curvature at 80 per cent of the velocity of sound or at about 880 feet per second for standard air density. This corresponds to a pressure of $$p = \frac{0.00237 \times 880^2}{2 \times 144}\left[1 + \frac{1}{4}\left(\frac{880}{1100}\right)^2\right] = 7.35 \text{ lb. per sq. in.}$$

A jet issued from this pressure fails to follow the body contour and so sets up the eddying wake which I eliminate.

If the jet is issued ahead of the locality of maximum thickness which in an aerodynamic body corresponds to the locality of maximum lateral curvature the pressure must be much lower than 7 lb. per sq. in. The use of a pressure of this magnitude is sufficient evidence that the energization of the boundary layer for drag reduction is not sought and hence does not come within the scope of this invention.

Pressures of 7 lb. per sq. in. are obtainable with positive type of compressors but such compressors are unsatisfactory for handling large volumes of air at low pressures such as I use. The impositive type of blower is more efficient, especially that type having vanes of airfoil section and presenting a leading edge to the flow.

Openings in the surface must be carefully formed if they are to be effective in the boundary layer energization process.

In the wing the openings should be distributed along the span so that they may influence a large portion of the span and area. In the limit the openings form a slot extending spanwise of rather narrow width. An opening with a large chordwise extension even of large expanse cannot be considered as an opening suitable for boundary layer energization. On any wing there is a pressure gradient chordwise and if the opening extends along a large proportion of the chord the pressure gradient will cause a forward flow in the opening which will reduce the lift and increase the frictional (profile) drag. The chordwise extension or width should be of the order of ½ to 6 per cent of the chord length with a preferred value of 1 per cent.

For blowing the slots are directed rearward so that the jet discharged from them flows along the body surface to the rear of the slots.

Figures 17, 18, 19, 20, 21:
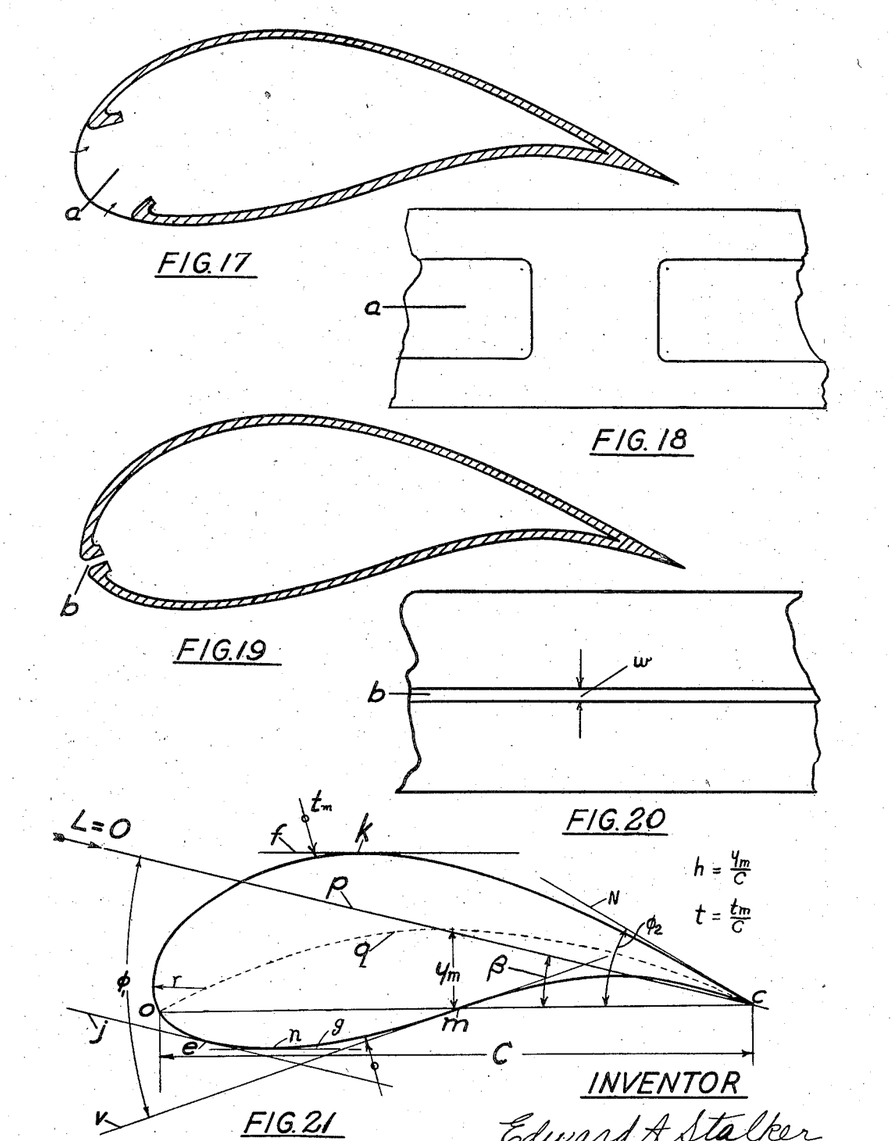
Figures 17 to 24 refer to the theory.

For suction the slots may be directed rearward, forward or normal. Large openings are in effect normal openings since the sides cannot overlap and such openings in the surface of the wing, especially at the leading edge, are destructive of the attempt to energize the boundary layer. That is, at the leading edge in particular the openings should not have an extension approaching the thickness of the wing. Figures 17 and 18 show the type of opening $a$ to be avoided while Figures 19 and 20 show a properly formed opening $b$. Such openings as $a$ destroy the flow which is so ardently sought by the carefully formed airfoil sections of today. On the other hand the narrow opening $b$ will have only a minor destructive effect on the flow about the airfoil. I prefer, however, to locate the slot or openings on the upper surface of the wing near the locality of maximum thickness, where for the same energy expenditure greater energization of the boundary layer results. The width $w$ of the nose slot $a$ should be smaller than the slots on the upper surface near the maximum thickness; it should be less than one-third the nose radius.

By side surface of an aircraft I mean any portion of the surface whose geometric normal to the surface is directed more across the relative wind than along it. A surface whose geometric normal is directed more into than transverse to the relative wind I call the nose or nose surface. It is possible for the nose surface to be completely removed by the opening, but in this case the normal to a membrane stretched across the opening between opposed sides of the body would be directed into the wind and will serve to define the nose.

A nose without a slot or with a slot of width less than the nose radius I define as virtually closed.

On the lower surface the inlet openings for the intake of the air should also be distributed along the span and located in the forward half of the wing so that at low angles of attack the flow along the under surface will be prevented from separating from the wing surface. The width of this slot should be preferably larger than the upper surface slot, namely, of a value of from ½ to 8 per cent of the wing chord, preferably 2 per cent.

A plurality of openings are desirable on bodies of great curvature, either as induction or discharge slots, or one of each. In any case there should be an appreciable expanse of body surface between the slots which will depend on the slot width and the jet velocity. Where these are proportioned for best effectiveness I find that the chordwise length between slots should be preferably greater than 15 per cent of the chord length.

Figure 1:
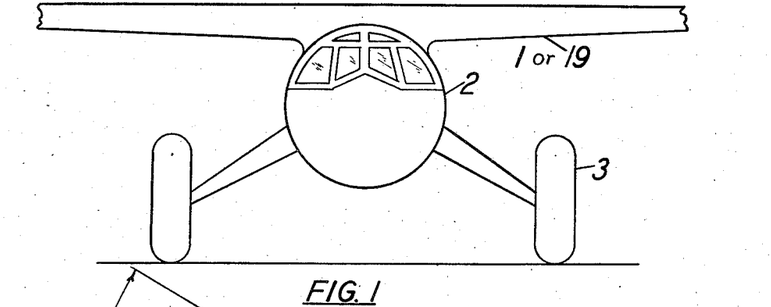
Figure 1 is a front elevation of the aircraft.
Figure 2:
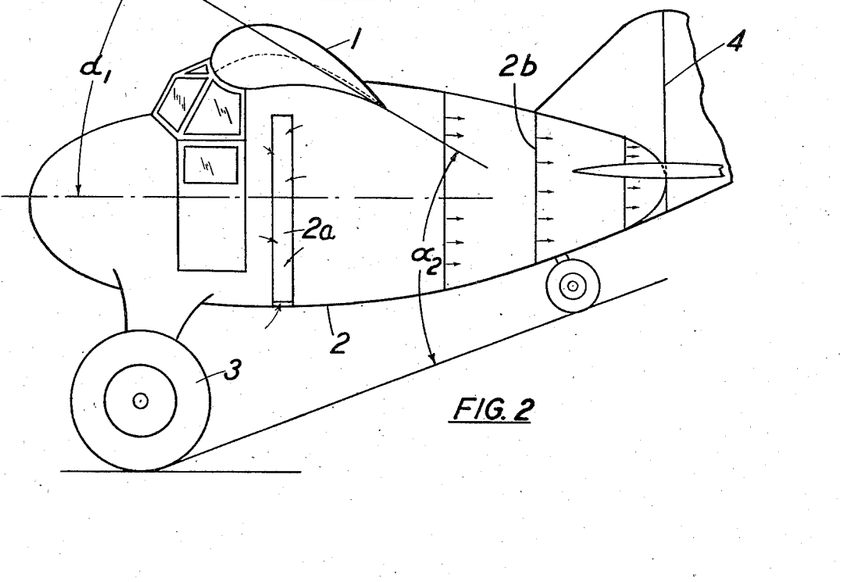
Figure 2 is a side elevation of one form of the aircraft.
Figures 3, 5:
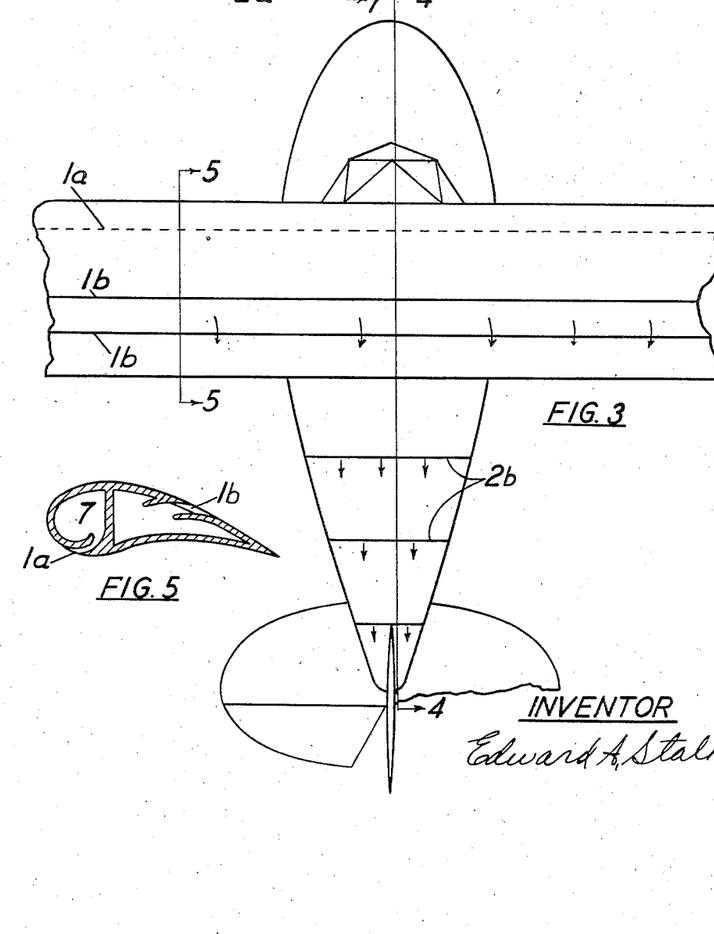
Figure 3 is a top plan of the aircraft.
Figure 5 is a vertical cross section of one type of wing along line 5—5 of Figure 3.

In one form of the invention I carry out the theory in the structure shown in the figures of which 1, 2 and 3 show exterior views. The wing is indicated by 1, the fuselage by 2, the landing gear by 3 and the tail group by 4.

Figure 4:
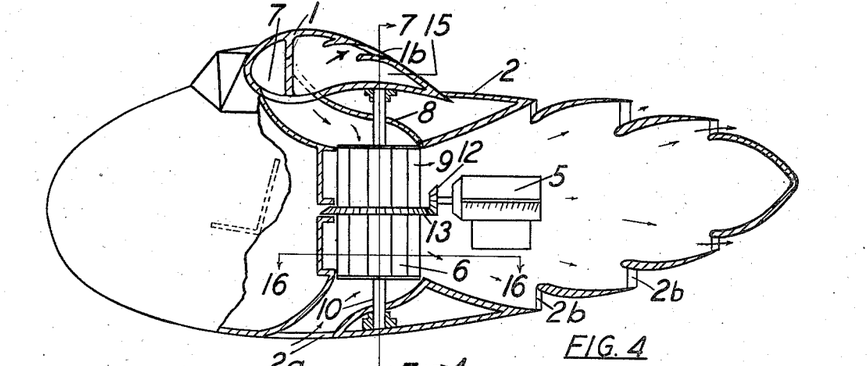
Figure 4 is a fragmentary longitudinal cross section of one form of the aircraft along the line 4—4 of Figure 3.

Referring to the longitudinal section in Figure 4 it will be noted that the fuselage 2 houses the engine 5 driving the blower 6. In the sides of the fuselage are the openings 2a and 2b. Air is inducted through the opening 2a near the maximum cross section of the fuselage. This is the proper location of the inlet so as to energize the boundary layer from suction and so as not to have a rearward component of the suction pressure.

At the top air is inducted through the wing opening 1a (see Figures 5 and 6) which is a surface slot leading into the compartment 7 of the wing interior. A duct 8 (see Figure 4) leads downward from compartment 7 to the blower 8 so that air is withdrawn from the wing.

Figures 6, 7, 8, 9, 10, 11:
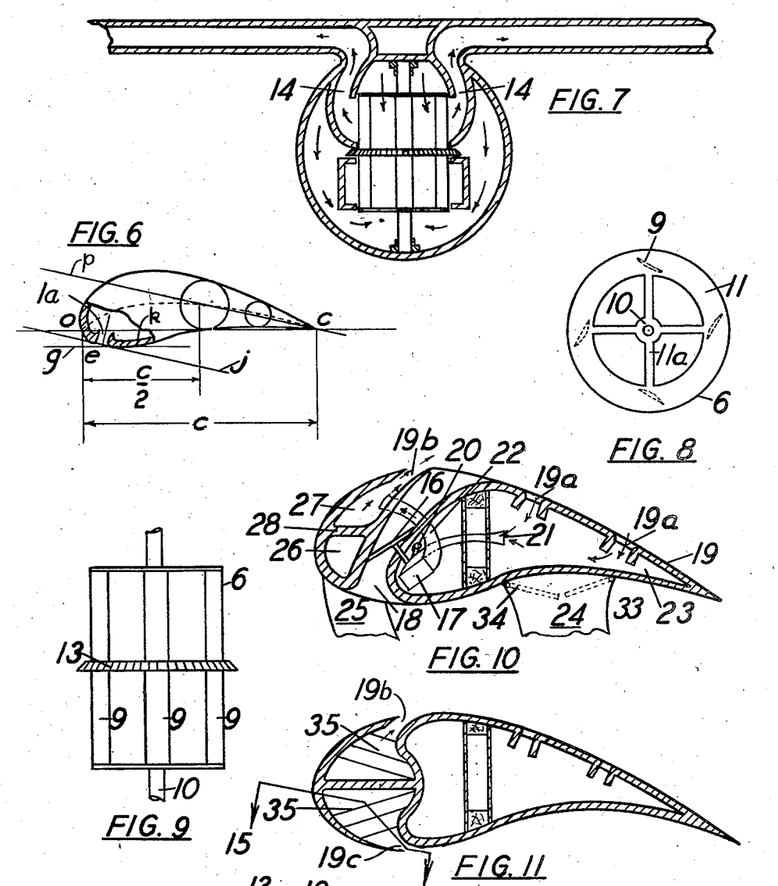

The blower 6 comprises a plurality of vanes 9 of airfoil form rotatable about a parallel axis 10 vertical in the aircraft. There are thus two inlets to the blower, one at the top and one at the bottom. The blower is shown in Figures 8 and 9 separate from the aircraft. The vanes are held to each other and the shaft 10 by the end pieces 11 having the radial arms 11a.

Referring again to Figure 4, the blower is driven by the engine 5 by means of the gears 12 and 13. Upon being rotated the blower draws air inward through the wing and fuselage openings and blows it out the fuselage and wing openings. (See Figures 4 and 7.) In the fuselage the discharge openings are 2b extending peripherally about its cross section. In the wing the discharge openings are 1b which are surface slots extending along a portion of the span at least equal to a major portion of the semi-span, preferably practically along the whole span. Ducts 14 lead from each side of the blower into the compartment 15 from which the slot 1b is fed.

As indicated in Figure 6 the lower surface slot may also have its axis normal to the surface. The location of this slot 1a is very important. It must be so located that the intake suction will have no appreciable rearward component. Hence the axis of the slot must not be inclined greatly rearward at the bottom if at all. It is true that the suction is small but the drag of the wing is also small so that even a little suction pressure if directed rearward will add an appreciable percentage to the total wing drag—in fact may add 30 to 50 per cent. The axis of the slot 1a should be normal to the zero lift line. The zero lift line is the line passing through the trailing edge and the mid point of the mean camber line. The $j$-line parallel to the zero lift line will determine the proper location of 1a by its point of tangency to the contour. The slot 1a should not be further back than the point of tangency of the $g$-line.

The zero lift line is significant in this connection because it represents the wind for zero lift coefficient and is extremely close by the direction of flight at maximum speed.

The induction of the air at the point 1a or 1 at high speed will keep the flow following the wing contour instead of leaving it and causing a high turbulence productive of an exorbitant drag, as explained earlier.

Thus the above describes one form of the invention wherein the boundary layer of the wings and fuselage is energized either by suction or blowing so as to reduce the drag in conjunction with creating a thrust by a blower housed within the aircraft.

In the form of the invention which I prefer I provide means actuated by the relative wind to energize the boundary layer so as to provide high lift coefficients for landing, that is, high lifting capacity. See Figures 3a, 4a, 10 and 11.

Air or fluid blown out or sucked in the upper surface will increase the maximum lift especially by permitting a large angle of attack. But a large lift is useful only in landing the airplane which frequently has to be done without the engine functioning. In such a case it is desirable to use energy from the relative wind to energize the boundary layer. I have shown in the Patent No. 1,691,942, granted November 20, 1928, how this may be accomplished by using energy from the wind. Briefly, the scheme consists in placing a turbine 16 and a blower 17. See Figure 10. The turbine is in the passage 18 extending through the wing 19 from the under surface to the upper surface. The flow of air through the passage due to the pressure difference on the wing actuates the blower 17 which, by means of the ducts 20 and 21, draws air through openings 19a and discharges it by the duct 22 through the slot 19b in the upper surface of the wing. The slots 19a and b extend along the span of the wing to within a few inches of the tips and the induction and discharge of the boundary layer through the slots creates a high lift at large angles of attack.

I find that the wing sections which are the most suitable for obtaining a high lift also have a high drag at small angles of attack corresponding to the condition of high speed. It is one of the objects of this invention to combine the means of propulsion with the high lift wing in such a way that the aircraft will give satisfactory operation at both high and low speeds. This is accomplished by propelling the aircraft in part by jets or sheets of fluid blown out the wing surface as previously described. It is in fact desirable to use the same slots or openings in the upper surface for propulsion and for the attainment of high lift at the time of landing with the engine stopped, so that the structure is not unduly weakened by a multiplicity of holes.

The type of wing most satisfactory for boundary layer energization is a thick highly cambered wing as shown in Figure 21. The maximum thickness is best expressed as a fraction $t$ of the chord length. The degree of camber is the maximum height $y_m$ of the mean camber line found by inscribing circles inside the wing contour and then passing a line $q$ through the centers of the circles. The height $y_m$ of the mean camber line above the chord subtending the camber line is best expressed as a fraction $h$ of the chord length $C$. The values of $t$ may be as high as one likes but practically 1.00 is the maximum. The airfoil would then be practically a circular cylinder and capable with boundary layer energization of producing lift coefficients as high as $4\pi$. However, I select the thickness as a function of $h$ primarily. The proportions I prefer are determined as follows.

Referring to Figure 21, draw a mean camber line $q$ giving the height $h$ desired above the chord $oc$. With a radius $r$ closely equal to one-half $h$ describe the nose radius $r$. The thickness $t$ should be equal approximately to $2r$ and be located between 0.30 and 0.45 of the chord $oc$. The lower surface contour of the forward half should be convex, that is, the ordinates are measured downward from the chord line $oc$. A tangent $v$ drawn to the under surface so as to make the maximum angle $\phi_1$ with the zero lift line $p$ should cross the chord $oc$ at its mid point $m$. $\phi_1$ should equal the angle $\phi_2$ at the trailing edge between lines $oc$ and $CN$ tangent to the upper surface at $C$ for best results. Draw the line $j$ parallel to $p$ giving the tangent to the under surface at $e$. Draw a smooth curve which is the extension of the nose through the given points $e$, $n$, $m$ to the trailing edge. Since the mean camber line partitions the thickness equally the drawing of the lower contour will determine the upper one. The direction of the zero lift line relative to the chord $oc$ is given by $\beta$.

At zero lift, that is, at zero angle of attack, the most forward position where the flow will break away from the body will be $e$. This will be readily realized by noting that the direction of the general flow is the tangent $j$ and ahead of $e$ the wind pressure will press the flow against the wing body. Hence the proper place for the lower surface slot is to the rear of $e$ since the flow due to its inertia will proceed somewhat to the rear of $e$, and also the angle of attack must always be larger than 0 to furnish some lift. If further ahead than $e$ the jet itself will leave the surface. I therefore locate the slot between $e$ and the point of tangency $n$ of line $g$. (See Figures 21 and 6.)

When the wing is tapered, the parameters of the airfoil geometry are to be referred to the wing section at the mean aerodynamic chord. The location of the mean aerodynamic chord is found by methods such as outlined in "Aircraft Handbook" by Warner and Johnson.

The above are the preferred parameters of the airfoil geometry but all may be varied within limits without very serious harm. The preferred limits are:

$h = 0.10$ to $0.60$
$r = 0.4h$ to $1.0h$
$t = 0.8 \, (h+0.08)$ to $2.0h$
$\phi_1 = 0$ to $\phi_2$
$om \pm 10\%$ $om = h + 0.20$ and the values between limits may be permuted in any order.

With the values of $t$ and $h$ and the wing proportions described the drag of the wings at high speed (low angles of attack) is a minimum for the lift required but is still excessive and so I introduce means to mitigate this undesirable condition. The high drag results from the failure of the relative wind to follow the under surface contour even when the wing is given the best available contour as described. However, by energizing the boundary layer at the proper locality on the lower surface, the flow may be made to conform to the lower surface and since the jet is discharged rearward it also serves the purpose of propelling the aircraft and the reduction in drag is a donation to a very large extent, that is, it costs nothing in additional energy.

The under surface jet should, of course, extend along the major portion of the span or at least along that portion of the span ahead of the major portion of the wing area.

Figure 22:
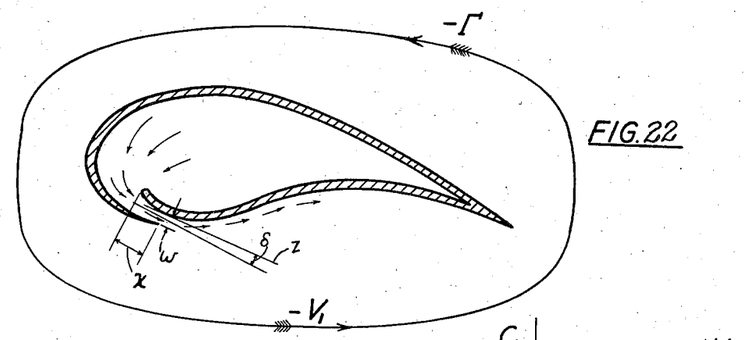
Figure 22A:
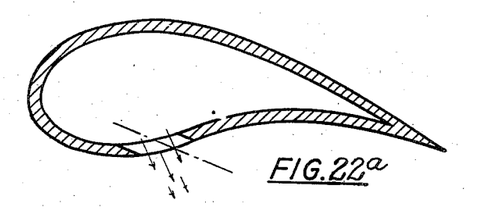

The rearward directed under surface slot, Figure 22, should have the same width $w$ that the forward slot of Figure 5 has. The direction of the slot should be such that the flow is tangential to the under surface. If $z$ is the tangent to the under surface at the slot exit, the angle between $z$ and the slot axis should not exceed 22 degrees. The sides of the slot should overlap a length $x$ at least equal to $w$ and the under surface should be well rounded at the exit of the slot. Figure 22a shows an incorrect form to be avoided since in spite of the direction of the axis of the slot the flow will be normal to the surface, because the sides of the opening do not overlap.

The use of boundary layer energization to obtain a high lifting ability also entails another disadvantage which may be suppressed by the means of propulsion employed. The value of the maximum lift coefficient occurs at too high angles for use as in ordinary wings. A conventional airplane has a range of angles of about 20 degrees between the angle for high speed and that for landing speed. This is about the maximum range practicable. A higher range will prove too unpleasant for the passengers and will raise the front of the machine up into the field of vision of the pilot and obstruct his view.

I am aware that mechanisms have been used to rotate wings relative to the fuselage but these devices entail extra weight and certain hazards of functioning. I prefer to use different means which eliminate these disadvantages.

Figure 23:
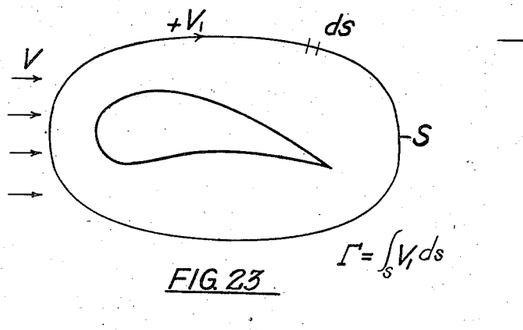

Aerodynamic theory teaches that the lift of a wing arises from a flow about a wing that may be divided into two components: a rectilinear flow and a circulatory flow as shown in Figure 23. The strength of the circulation flow is defined as the integral of $V_1 ds$, that is, the integral of the circulation velocity $V_1$ around the curve $S$. The strength of the circulation called $\Gamma$ is the same for all closed lines about the wing section. See Figure 23. The lift coefficient per foot of span is then $$C_L = \frac{2\Gamma}{cV}$$

where $c$ is the chord $oc$ and $V$ is the velocity of flight. In this equation no allowance is made for tip losses. To make allowance for tip losses the value of $C_L$ should be multiplied by $$\frac{\pi}{4}$$

The circulation has a positive value for positive angles of attack and gives a positive lift, but it would be possible to impose artificially a negative circulation on the wing so as to reduce its lift. Then it would not be necessary to rotate the wing bodily to smaller angles of attack.

The negative circulation may be imposed by blowing a jet out the under surface of the wing rearward as indicated in Figure 22.

To utilize this idea the wing must be set at a higher angle on the fuselage than is customary. Present-day wings are set on the fuselage so that when the airplane is flying with a horizontal thrust line the angle of attack of the wing corresponds to the maximum ratio of lift to drag. It may be shown further that when the ratio is a maximum $$C_{L1} = \sqrt{\pi R C_{DPw}} \quad (12)$$

The angle of attack corresponding to this value of $C_L$ is $$\alpha_1 = \frac{d\alpha}{dC_L} C_{L1} \quad (13)$$

where $$\frac{d\alpha}{dC_L}$$

is the reciprocal of the slope of the lift curve.

$$\frac{dC_L}{d\alpha} = \frac{5.35\pi R}{\pi R + 5.35} \quad (14)$$

Then $$\alpha_1 = \frac{57.3(\pi R + 5.35)}{5.35\pi R} \sqrt{\pi R C_{DPw}} \quad (15)$$

in degrees. The profile drag of the wing is a function of its thickness and is given by $$C_{DPw} = 0.01 + 0.01t + 0.1t^2 \quad (15a)$$

Hence $$\alpha_1 = \frac{57.3(\pi R + 5.35)}{5.35\pi R} \sqrt{\pi R (0.01 + 0.01t + 0.1t^2)} \quad (16)$$

in degrees. This is the angle of set of wings on present-day airplanes referred to the zero lift line and the thrust line in the airplane. For $t = 0.15$ $\alpha_1 = 6.4$ degrees for instance.

I set the wings at values far larger than that given by Equation (16) but of course do not exceed the maximum lift angle for the wing with boundary layer energization to obtain a high maximum lift. The maximum angle of set practical would be $$\alpha_m = \frac{\pi R + 5.35}{5.35 R\pi} 4\pi \text{ in radians}$$

$$= \frac{43(\pi R + 5.35)}{R} \quad (17)$$

in degrees.

When the aircraft lands the angle between the wing and the ground should correspond to the maximum lift of the wing. If the high lift wing were set at the customary angle on the fuselage the landing gear would have to be too long or the fuselage too short. But when the wing is set at the proposed large angle to the thrust line the landing gear may be of normal length.

Figure 24:
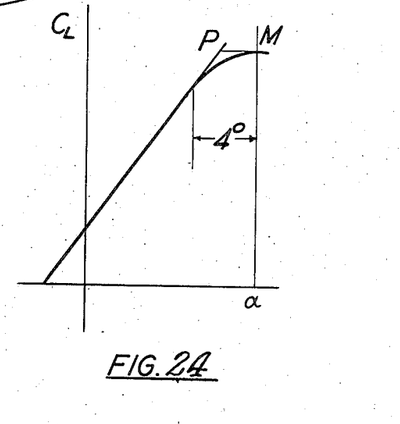

With a conventional wing the angle between the ground and the zero lift line is $$\alpha_t = \frac{3.4(\pi R + 5.35)}{R}(0.9 + 9h) + 4 \quad (18)$$

in degrees. The 4 degrees are to take account of the curved extension of the curve from P to M. See Figure 24. In this invention the angle is far larger than this and may approach $\alpha_m$ as given by Equation (17).

I prefer a value 50 per cent larger than that given by Equation (18) for the setting of the wing on the fuselage relative to the line in the aircraft when it is proceeding horizontally at maximum speed. This is very closely the direction of the propeller shaft or thrust line.

The value of the angle between the ground line and the wing may be as high as that given Equation (17). Incorporating the 50 per cent increase a practical rule is $$\alpha_2 = \frac{(\pi R + 5.35)}{5.35\pi R}(0.9 + 9h)$$

$$= \frac{5.1}{R}(\pi R + 5.35)(0.9 + 9h) + 4 \quad (19)$$

in degrees, where $h$ and $R$ are at the choice of the designer. $R$ is determined in any airplane by structural considerations and the use of the airplane. From similar considerations $h$ is determined, but for a general purpose airplane I prefer a value of $h$ between 0.20 and 0.25.

In order to specify unambiguously the angle of set relative to the thrust line and the landing gear limits for the products of $R$ by $t$ and $R$ by $h$ have to be given. Thus $Rt$ should be equal to or greater than 0.90 and $Rh$ should be equal to or greater than 0.60.

Thus the value of $Rt = 0.9$ is larger than the value of 0.50 for the lower limit of $Rt$ considering the efficiency of the propulsive means. It is to be noted that the value of 0.50 is a lower limit and that I prefer values of $Rt$ of the order of 3.0. The content of the subject of airplane design is largely concerned with compromise between nature's laws and it is not surprising that the conditions for the best effectiveness of propulsion at one speed do not harmonize completely for the best effectiveness at another speed.

In order to ensure an adequate discharge of air out the under surface to create a large enough negative circulation I make the bottom slot of greater width $w$ than the upper. At high speed only enough air is discharged from the upper surface opening to maintain a low resistance.

I also provide a valvular means of differentially controlling the flow to the upper and lower surface slots.

Figure 3A:
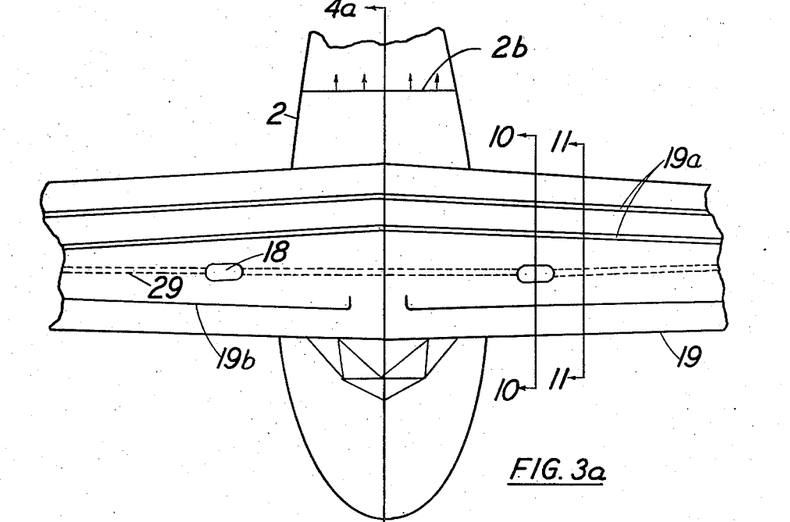
Figure 3a is the top plan of the preferred form of the invention.
Figure 4A:
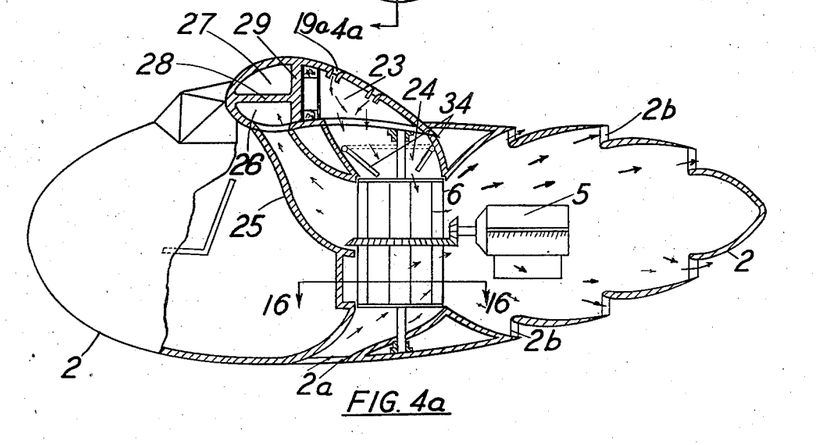

I carry out the preferred form of the invention in the following manner. Figures 1, 2 and 3a show the external appearance of the aircraft while Figure 4a shows a longitudinal section. In this form of the invention the blower 6 inducts air from the rear wing compartment 23 by way of the duct 24 leading to one end of the blower. The air flows into the wing through the slots 19a. The air is in part discharged through the bottom slot 19c shown in Figure 11 and extending along the span similarly to the upper slot 19b, and through the latter. The duct 25 conveys the air from the blower to the wing compartments 26 and 27 formed by the horizontal wall 28 and vertical wall 29 shown in Figures 3a and 4a. This wall also serves as a spar to support the wing.

Figure 12:
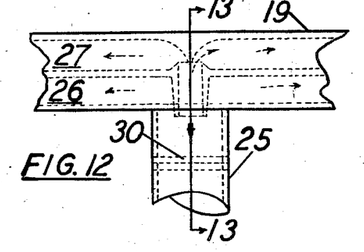
Figure 12 is a fragmentary front view of the central portion of the preferred wing.
Figure 13:
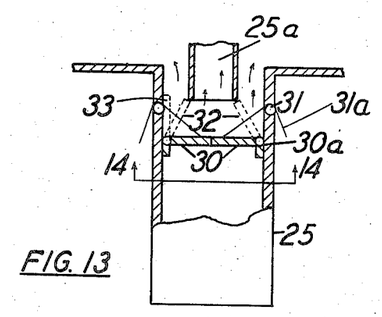
Figure 13 is a vertical longitudinal section along the line 13—13 in Figure 12.

The duct 25 is also shown in front view in Figure 12 and in section in Figure 13. In the duct 25 are two flaps 30 forming a valve which may be operated by the cables 31 running over the pulleys 31, carried in the duct 25. When pulled entirely up the flaps leave an unobstructed passage for the flow in duct 25. When all the way down the passage is completely closed, an intermediate position will control differentially the amount of air going to the compartments 26 and 27 since the duct 25 leads directly into the compartment 26 but compartment 27 is entered through the duct 25a centrally located in duct 25. In the position 32 the flaps send the air to the upper slot while in the full open position 33, shown in Figure 12, the proportion is correct for high speed flight, with the major portion going to the under surface slot.

Figure 14:
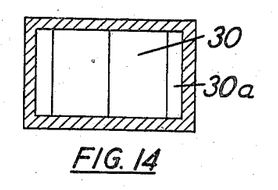
Figure 14 is a fragmentary section along the line 14—14 in Figure 13.
Figure 15:
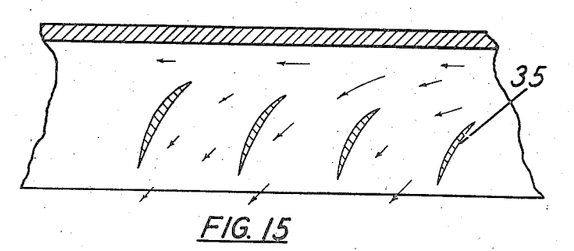
Figure 15 is a fragmentary section along the line 15—15 in Figure 11.
Figure 16:
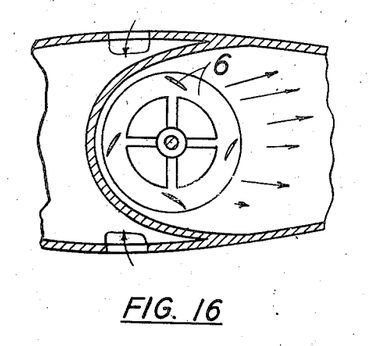

Figure 14 shows a cross section of the duct 25 just below the flaps 30 in Figure 13. The flaps are hinged to the side wall by the hinges 30a.

Flaps 34 (Figure 4a) are also provided in the duct 24 and they are arranged so that the suction of the blower opens them while suction in the wing due to the lift closes them automatically. Thus there will be no infiltration of air to destroy the suction created by the means of pumping 17 when the prime mover stops. Thus while the prime mover is running a high lift at landing is available from the energization of the boundary layer through the slots in the upper surface and if the engine stops the means of pumping 17 alone assumes the office of creating the high lift for landing. Thus both the blower 6 and the means of pumping 17 cooperate to ensure an adequate lift through the mediumship of the compartment 23 and slots 19a and 19b.

It may be noted that at high speed the slots 19a are about normal to the direction of flight (zero lift line very closely) and so their suction does not add to the drag of the wing.

The inlet and discharge openings in the fuselage in the preferred form of the invention are the same as for the first form discussed.

When the air or fluid is blown into the compartment at the center of the span and proceeds outward, it tends to pack at the tip and all flow out the slot at the tip. This is very ineffective. The flow out the slot should be distributed along the span in accordance with the length of the chord, so that more air should flow out near the wing root. In order to achieve the correct flow I insert streamline vanes 35 in the compartments 25 and 26. The vanes near the entrance of the duct 25 project furthest into the stream and each succeeding vane toward the wing tip recedes from the flow. The rate of recession is such that the proper amount of air reaches each point along the span.

I have used the term body to indicate broadly any body and the term fuselage to represent a container or housing body supported by the wings. Thus a nacelle as for engines is a fuselage.

I have also used the term slot to mean an elongated opening in the surface of the wing but I wish to be understood in the use of this term that a series of openings distributed in the same general direction as the slot may always be substituted.

I define opposed sides or surfaces as those whose expanse face each other. Thus the upper and lower surfaces of the wings are opposed surfaces or sides but the upper surfaces of the wings on opposite sides of the plane of symmetry of the aircraft are not opposed surfaces or sides.

It is important in energizing the boundary layer on the upper surface of the wing to create a high lifting capacity that openings in the wing surface do not permit the sucking of air into the region above the wing by the low pressure region above the wing. It must be remembered that air added to the flow over the upper surface must be directed rearward along the surface and have a greater energy content than the air which has arrived above the wing by the normal route.

If the openings in the upper surface are open and air flows to the upper surface from the interior of the aircraft across sharp edges and constricted passages the energy of the air will be dissipated in turbulence and subsequently as heat. If this air originally had only the energy of the relative wind the amount of energy available at the upper surface opening will be below the energy of the air arriving by the normal route because of the smooth contour of the wing surface. Air entering from atmospheric regions off the wing such as the region above the fuselage will cause a great drop in the maximum lifting capacity. Air will enter the wing from any region outside the locality of suction on the wing, and it should be remembered that the suction is greatest right at the surface of the wing.

The presence of the denergized air will cause the normal wind stream above the wing to separate from the wing surface with a ruination of the lifting capacity of the wing at large angles especially. If means are provided for energizing the boundary layer to obtain augmented maximum lifting capacity for landing, the introduction of the deenergized air will cause even greater losses of maximum lift and once the wind stream has separated from the surface it cannot be regained except by diving the airplane. This maneuver could not be executed safely at a time of landing. Hence it is imperative that openings in the upper surface should not introduce deenergized air into the wind stream above the wing and sealing means should be provided to prevent the deenergized air from ruining the action of the means used to energize the boundary to obtain safe landing speeds.

It will now be apparent that the means of creating the high lift for landing is dependent on the wing section which increases the resistance for high speed flight and that the means of propulsion employed functions to suppress this undesirable drag while yet promoting and facilitating the attainment of high lifting capacity. In fact the lift and drag of the wing and the propulsive system are associated together through the use of the boundary layer to provide a safe and efficient flying machine for the whole flight range of angles of attack.

It is not claimed that all the functions are performed simultaneously but only in their natural or necessary sequence as, for instance as the speed of flight is changed.

While I have illustrated specific forms of the invention it is to be understood that modifications, variations and substitutions may be made without departing from the spirit of the invention as defined by the appended claims.

I claim:

1. In an aircraft, a wing subject to the rearward rush of the relative wind due to the aircraft's forward motion, said wing having a divided surface to form an inlet opening extending along a major portion of the semi-span and a divided side surface to form a rearward directed discharge opening in the forward two-thirds of the wing for use in energizing the boundary layer, a principal means of propulsion comprising a means of blowing directing a major portion of its blown fluid into the aircraft interior and a prime mover to actuate it, and means providing for the transference of fluid from the inlet opening to the discharge opening by the means of blowing so that a fluid jet is dischargeable rearward to serve the dual purpose of reducing the resistance and of creating a thrust to propel the aircraft, said fluid jet providing by its mass reaction the chief propulsive force.

2. In an aircraft, a fuselage, a wing to support the fuselage and subject to the rearward rush of the relative wind due to the aircraft's forward motion said fuselage having divided surfaces to form inlet openings on opposed sides of the fuselage, a divided side surface of the aircraft to form a discharge opening directed rearward, a principal means of propulsion comprising a means of blowing directing a major portion of its blown fluid through the interior of the aircraft and a prime mover to actuate it, and means of communication between the means of blowing and said openings so that a fluid jet is dischargeable rearward to serve the dual purpose of reducing the resistance by energizing the boundary layer and of creating a thrust to propel the aircraft.

3. In an aircraft, a wing subject to the rearward rush of the relative wind due to the aircraft's forward motion, said fuselage having a perforated side surface to form an inlet opening, a perforated side surface of another part of the aircraft to form a rearward directed opening in the forward two-thirds of the part for use in energizing the boundary layer, a principal means of propulsion comprising a means of blowing directing a major portion of its blown fluid into the aircraft interior and a prime mover to actuate it, means of communication virtually closed against the direct influx of the oncoming wind between the means of blowing and the said wing opening so that the wing boundary layer can be energized to reduce the resistance, and means of communication between the means of blowing and the said opening in the said part of the aircraft so that a fluid jet is dischargeable therethrough to serve the dual purpose of reducing the resistance and of creating a thrust.

4. In an aircraft, a wing to support the aircraft and subject to the rearward rush of the relative wind due to the aircraft's forward motion, divided surfaces of the aircraft to form inlet openings in opposed sides of the aircraft and a discharge opening in a side suitable for use in energizing the boundary layer, a principal means of propulsion comprising a means of blowing housed within the aircraft and a prime mover to actuate it, and means of communication between the means of blowing and the said openings so that a fluid jet is dischargeable rearward to serve the dual purpose of reducing the resistance by energizing the boundary layer and of creating a thrust.

5. In an aircraft, a fuselage, a wing subject to the rearward rush of the relative wind to support the fuselage, said fuselage having a perforated side surface to form an inlet opening for the induction of the boundary layer and a rearward directed opening in the forward two-thirds of the fuselage length suitable for use in energizing the boundary layer, a principal means of propulsion comprising a means of blowing directing a major portion of its blown fluid through the aircraft interior and a prime mover to actuate it, and means of communication between said openings and the means of blowing so that a fluid jet is dischargeable rearward to serve the dual purpose of reducing the resistance by energizing the boundary layer and of creating a thrust to propel the aircraft.

6. In an aircraft, a fuselage, a wing to support the fuselage and subject to the rearward rush of the relative wind due to the aircraft's forward motion, a divided surface of the aircraft to form an inlet opening, a plurality of rings of airfoil cross section spaced apart to form the aft portion of the fuselage with transverse peripheral slots therein, a means of blowing, and means of communication between the means of blowing and the said inlet opening and slots so that a fluid jet is dischargeable rearward.

7. In an aircraft, a fuselage, a wing to support the fuselage, said fuselage having a divided side surface to form a rearward directed slot succeeded at least within a length equal to half the body thickness at the slot by a surface turned from the flow at the slot, said slot being formed to discharge fluid rearward along the body surface, a means of blowing, and means of communication between the means of blowing and the slot so that a fluid jet is dischargeable rearward to energize the boundary layer and thereby reduce the resistance.

8. In an aircraft, a wing subject to the rearward rush of the relative wind due to the aircraft's forward motion and having a divided lower surface to form an induction opening, a perforated surface of the aircraft to form a rearward directed discharge opening suitable for use in energizing the boundary layer, a principal means of propulsion comprising a means of blowing directing a major portion of its blown fluid through the aircraft interior and a prime mover to actuate it, and means of communication between the said induction and discharge openings and the means of blowing so that a fluid jet is dischargeable rearward from the discharge opening to serve the dual purpose of reducing the resistance by energizing the boundary layer and of creating a thrust.

9. In an aircraft, a wing subject to the rearward rush of the relative wind due to the aircraft's forward motion and having a divided upper surface to form a rearward directed spanwise discharge slot and a divided lower surface to form an inlet slot, a principal means of propulsion comprising a means of blowing housed within the aircraft and a prime mover to actuate the means of blowing, means of communication between the means of blowing and said slots so that a fluid jet is dischargeable rearward to serve the dual purpose of reducing the resistance by energizing the boundary layer and of creating a thrust to propel the aircraft.

10. In an aircraft, a wing subject to the rearward rush of the relative wind due to the aircraft's forward motion and having a divided lower surface of the wing to form a forward directed inlet slot and a divided upper surface of the wing to form a rearward directed discharge slot, a principal means of propulsion comprising a means of blowing housed within the aircraft and a prime mover to actuate it, means of communication between the means of blowing and said slots so that a fluid jet is dischargeable rearward to serve the dual purpose of reducing the resistance by energizing the boundary layer and of creating a thrust to propel the aircraft.

11. In an aircraft, a fuselage, a wing to support the fuselage, which has a divided side surface to form a rearward directed slot for the discharge of fluid along the fuselage surface, the opposed surfaces of said fuselage aft of the slot being curved from the flow, means of blowing, and means of communication between the said slot and the means of blowing so that a fluid jet is dischargeable rearward to energize the boundary layer and thereby reduce the resistance.

12. In an aircraft, a fuselage, a wing to support the fuselage and subject to the rearward rush of the relative wind, said fuselage being unencircled by a double walled open ended tube of length greater than the diameter in the region vertically in line with the wing, said fuselage having a side surface slot extending around a major portion of its transverse periphery for the discharge of fluid rearward along the surface, said wing having a perforated surface to form a spanwise slot in communication with the wing interior, a principal means of propulsion comprising a means of blowing directing a major portion of its blown fluid into the aircraft interior and a prime mover to actuate it, and means providing for the transference of fluid from the wing slot to the fuselage opening by the means of blowing so that a fluid jet is dischargeable rearward to serve the dual purpose of reducing the resistance and of creating a thrust.

13. In an aircraft associated with a relative wind, a wing having a hollow interior and a divided surface to form a slot in communication with the wing interior, a means of pumping actuated by the relative wind, means of communication between the means of pumping and the wing slot to cause a flow therethrough to energize the boundary layer, a principal means of propulsion comprising a means of blowing and a prime mover to actuate it, means of communication between the means of blowing and the said surface slot for use in forming a propulsive fluid jet to serve the dual purpose of reducing the resistance by boundary layer energization and of creating a thrust, and means usable to seal the means of pumping from the means of blowing.

14. In an aircraft, a fuselage, a wing to support the fuselage and having an upper surface opening, means actuated by the relative wind to induce a flow through said opening to energize the boundary layer and provide a high lifting capacity for landing, said wing being carried on the fuselage so that the angle in degrees between a horizontal line in the fuselage when the airplane is flying at maximum level speed and the zero lift line of the wing lies between $$\alpha_1 = \frac{3.4}{R}(\pi R + 5.35)\sqrt{\pi R(0.010 + 0.01t + 0.1t^3)}$$

and $$\alpha_m = \frac{43}{R}(\pi R + 5.35),$$

for a product of R by $t$ equal to or greater than 0.90, said wing having a divided lower surface of the wing to form a rearward directed slot, and a means of blowing in communication with said slot so that a fluid jet is dischargeable rearward to reduce the lifting capacity for high speed flight by creating a negative circulation and thereby reducing the effective angle of attack.

15. In an aircraft, a landing gear, a hollow wing having means actuated by the relative wind to energize the boundary layer to create a high maximum lifting capacity for landing but giving rise to an undesirably large range of angles between zero lift and maximum lift, means to make feasible the use of the high lifting capacity at landing comprising a setting of the aircraft on the landing gear so that the angle in degrees between the ground line and the zero lift line of the wing is between $$\alpha_1 = \frac{3.4(\pi R + 5.35)}{R}(0.9 + 9h) + 4$$

and $$\alpha_m = \frac{43(\pi R + 5.35)}{R}$$

for a product of R by $h$ equal to or greater than 0.60, and means to make feasible high speed flight without a large negative rotation of the wing comprising a divided lower surface of the wing to form a rearward directed spanwise slot, a means of blowing and a prime mover to operate it, means of communication between the means of blowing and the slot so that a fluid jet is dischargeable to set up a negative circulation to reduce the effective angle of attack for high speed flight.

16. In an aircraft associated with a relative wind, a wing having a divided upper surface to form a slot extending spanwise, the major part of the wing forward of the slot being substantially rigidly attached to the part rearward of the slot, means actuated by the relative wind to cause a flow through the said upper surface slot, said wing having a wing section whose maximum mean camber ordinate has a value of between 10 per cent and 60 per cent of the chord length and cooperates with said means actuated by the relative wind to augment the maximum life coefficient by boundary layer energization, said wing giving rise to a high drag at low angles of attack because of the high camber, and a principal means of propulsion comprising a means of blowing directing a major portion of its fluid discharge into the aircraft interior and a prime mover to actuate it, a divided lower surface of the wing to form a rearward directed slot, and means of access of the said fluid discharge to the slot so that a fluid jet is dischargeable rearward therefrom to serve the dual purpose of reducing the said drag by energizing the boundary layer and of creating a thrust.

17. In an aircraft, a wing having a spanwise slot in the upper surface in the forward two-thirds of the wing in communication with the wing interior, said slot having a width greater than ½ per cent of the chord and $\frac{3}{4}$ of an inch to pass a flow suitable for energizing the boundary layer, a perforated lower surface of the wing to form another slot, said wing having a lower contour such that the lower surface of the wing turns from the flow at the said lower surface slot aft thereof, a principal means of propulsion comprising a means of blowing directing a major portion of its blown fluid into the aircraft and a prime mover to actuate it, and means of communication between the means of blowing and said slots so that the means of blowing can discharge fluid rearward more along than normal to the wing surface from at least one of the slots to serve the dual purpose of energizing the boundary layer to reduce the resistance and of creating a thrust.

18. In an aircraft, a wing to support it and having a spanwise slot in the upper surface in the forward two-thirds of the wing in communication with the wing interior, said slot having a width greater than ½ per cent of the chord and $\frac{3}{4}$ of an inch to pass a flow suitable for energizing the boundary layer, said wing having a perforated lower surface to form a rearward directed spanwise slot to discharge fluid more along than normal to the wing surface, said wing having a lower contour such that it turns from the flow of the slot aft thereof, a means of propulsion comprising a means of blowing directing a major portion of its fluid discharge into the aircraft and a prime mover to actuate it, and means of communication between the means of blowing and the said surface slots to discharge a fluid jet rearward from at least one of the slots to serve the dual purpose of energizing the boundary layer to reduce the resistance and of creating a thrust.

19. In an aircraft, a wing having a spanwise slot in its upper surface in the forward two-thirds of the wing in communication with the wing interior and a perforated lower surface to form a rearward directed spanwise slot, said wing having such a lower contour that the wing surface turns from the flow at the slot aft thereof, a principal means of propulsion comprising an impositive means of blowing emitting fluid at a pressure less than 7.35 pounds per square inch and directing a major portion of its blown fluid into the aircraft interior, a prime mover to actuate the means of blowing, and means of communication between the means of blowing and said slots providing for the discharge of fluid from the means of blowing along the wing surface rearward at least from one of the slots to serve the dual purpose of energizing the boundary layer to reduce the resistance and of creating a thrust.

20. In an aircraft, a fuselage, a wing subject to the rearward rush of the relative wind due to the aircraft's forward motion to support the fuselage, said wing having an airfoil section of tapered end portions so as to create a normal boundary layer, means defining a discharge opening in the surface of the fuselage, said discharge opening being directed rearward for the discharge of fluid more along than normal to the surface, a principal means of propulsion comprising a means of blowing discharging a major portion of its blown fluid into the aircraft interior and a prime mover to actuate it, walls defining an induction opening or openings in the side surface of the aircraft for the energization of the boundary layer to reduce the resistance. said opening or openings having an induction area for the means of blowing lying between $$A_{f1}=A\left\{\left|\frac{1.44}{3\pi R}\right.+\left[0.0388+0.01t+0.01t^3+0.21\frac{A_f}{A}\right]\left(\frac{1}{3}-\frac{t}{2}\right)\right\}$$

and $$A_{f2}=A\left\{\left|\frac{16\pi}{3R}\right.+\left[3.19+0.01t+0.1t^3+0.21\frac{A_f}{A}\right]\left(\frac{1}{3}-\frac{t}{2}\right)\right\}$$

means providing for the transference of fluid from the said induction opening to the said discharge opening by the means of blowing so that a fluid jet is dischargeable rearward to serve the dual purpose of reducing the resistance by boundary layer energization and of creating a thrust.

21. In an aircraft, a fuselage, a wing subject to the rearward rush of the relative wind due to the aircraft's forward motion to support the fuselage, said wing having an airfoil section of tapered aft end so as to create a normal boundary layer, means defining discharge openings in the side surface of the fuselage, said discharge openings being directed rearward for the discharge of fluid jets more along than normal to the surface and being arranged one behind the other so that each succeeding jet energizes the boundary layer of the preceding one, a principal means of propulsion comprising a means of blowing discharging a major portion of its blown fluid into the aircraft interior and a prime mover to actuate it, walls defining an induction opening or openings in the surface of the aircraft for the means of blowing lying between $$A_{f1}=A\left\{\left|\frac{1.44}{3\pi R}\right.+\left[0.038+0.01t+0.01t^2+0.21\frac{A_f}{A}\right]\left(\frac{1}{3}-\frac{t}{2}\right)\right\}$$

and $$A_{f1}=A\left\{\left|\frac{16\pi}{3R}\right.+\left[3.19+0.01t+0.1t^3+0.21\frac{A_f}{A}\right]\left(\frac{1}{3}-\frac{t}{2}\right)\right\}$$

means providing for the transference of fluid from the said induction opening and to the said discharge opening by the means of blowing to serve the dual purpose of reducing the resistance and of creating a thrust.

22. In an aircraft a wing subject to the rearward rush of the relative wind due to the aircraft's forward motion to support the aircraft, said wing having an airfoil section of tapered end portions so as to create a normal boundary layer, means defining a discharge opening in the surface of the aircraft, said discharge opening being directed rearward for the discharge of fluid more along than normal to the surface, a principal means of propulsion comprising a means of blowing discharging a major portion of its blown fluid into the aircraft interior and a prime mover to actuate it, walls defining an induction opening or openings in the side surface of the aircraft for the energization of the boundary layer to reduce the resistance, said opening or openings having an induction area for the means of blowing lying between $$A_{f1}=A\left\{\left|\frac{1.44}{3\pi R}\right.+\left[0.0388+0.01t+0.01t^3+0.21\frac{A_f}{A}\right]\left(\frac{1}{3}-\frac{t}{2}\right)\right\}$$

and $$A_{f2}=A\left\{\left|\frac{16\pi}{3R}\right.+\left[3.19+0.01t+0.1t^2+0.21\frac{A_f}{A}\right]\left(\frac{1}{3}-\frac{t}{2}\right)\right\}$$

means providing for the transference of fluid from the said induction opening to the said discharge opening by the means of blowing so that a fluid jet is dischargeable rearward to serve the dual purpose of reducing the resistance by boundary layer energization and of creating a thrust.

23. In an aircraft, a fuselage, a wing subject to the rearward rush of the relative wind to support it, a perforated side surface of the aircraft to form an inlet opening, said fuselage having a perforated surface to form a discharge slot directed rearward, a principal means of propulsion comprising a means of blowing and a prime mover to actuate it, said means of blowing directing a major portion of its blown fluid into the aircraft interior, means of communication between the means of blowing and the said inlet opening so that the means of blowing inducts air chiefly from the side surface of the aircraft to energize the boundary layer and reduce the drag, and means providing for the discharge of fluid rearward from the said discharge slot by the means of blowing to create a thrust to propel the aircraft.

24. In an aircraft, a wing subject to the rearward rush of the relative wind due to the aircraft's forward motion, said wing having a plan form and airfoil section providing such values of the aspect ratio and wing thickness as a fraction of the chord that their product is greater than 0.50 and giving rise to a significant profile drag in comparison to the induced drag, means defining a rearward directed discharge opening with overlapping sides in the side surface of the aircraft for the discharge of fluid substantially tangentially to the side surface, a principal means of propulsion comprising a propulsive means of blowing discharging a major portion of its blown fluid into the aircraft interior and a prime mover to actuate it, walls defining an induction opening or openings having an induction area for the means of blowing lying between $$A_{f1}=A\left\{\left|\frac{1.44}{3\pi R}\right.+\left[0.0388+0.01t+0.1t^2+0.21\frac{A_f}{A}\right]\left(\frac{1}{3}-\frac{t}{2}\right)\right\}$$

and $$A_{f2}=A\left\{\left|\frac{16\pi}{3R}\right.+\left[3.19+0.01t+0.1t^3+0.21\frac{A_f}{A}\right]\left(\frac{1}{3}-\frac{t}{2}\right)\right\}$$

tion of the discharged air with a low enough velocity to reduce the said profile drag by boundary layer energization, means providing for the transference of fluid from the said induction opening to the said discharge opening by the means of blowing so that a fluid jet is dischargeable rearward to serve the dual purpose of reducing the drag by boundary layer energization and of creating a thrust to propel the aircraft, at least one of said openings being in the wing surface.

25. In an aircraft, a wing subject to the rearward rush of the relative wind due to the aircraft's forward motion, said wing having perforated upper and lower surfaces to form discharge slots having overlapping sides and extending spanwise in communication with the wing interior and directed rearward for the discharge of fluid more along than normal to the surface, a principal means of propulsion comprising a propulsive means of blowing discharging a major portion of its blown fluid into the aircraft interior, walls defining an induction opening or openings for the means of blowing with an induction area having a value lying between $$A_{j1}=A\left\{\frac{1.44}{3\pi R}+\left[0.0388+0.01t+0.1t^2+0.21\frac{A_f}{A}\right]\left(\frac{1}{3}-\frac{t}{2}\right)\right\}$$

and $$A_{j2}=A\left\{\frac{16\pi}{3R}+\left[3.19+0.01t+0.1t^2+0.21\frac{A_f}{A}\right]\left(\frac{1}{3}-\frac{t}{2}\right)\right\}$$

for the product $Rt$ equal to or greater than 0.50 so that enough air can be inducted for discharge from the aircraft to propel it by the mass reaction of the discharged air with a low enough velocity to reduce the profile drag of the wing by boundary layer energization, means providing for the transference of air from the said induction opening to the said discharge slots by the means of blowing so that a jet is dischargeable rearward to serve the dual purpose of reducing the drag and of creating a thrust, and means to control the flow differentially between the upper and lower surface slots.

26. In an aircraft, a wing subject to the rearward rush of the relative wind due to the aircraft's forward motion, said wing having a plan form and airfoil section providing such values of the aspect ratio and wing thickness as a fraction of the chord that their product is greater than 0.50 and creating a large profile drag in comparison to the induced drag and divided upper and lower surfaces to form rearward directed openings having overlapping sides so as to discharge substantially tangentially to the surface, a principal means of propulsion comprising a propulsive means of blowing discharging a major portion of its blown fluid into the aircraft interior, walls defining an induction opening or openings having an induction area lying between.

$$A_{j1}=A\left\{\frac{1.44}{3\pi R}+\left[0.0388+0.01t+0.1t^2+0.21\frac{A_f}{A}\right]\left(\frac{1}{3}-\frac{t}{2}\right)\right\}$$

and $$A_{j2}=A\left\{\frac{16\pi}{3R}+\left[3.19+0.01t+0.1t^2+0.21\frac{A_f}{A}\right]\left(\frac{1}{3}-\frac{t}{2}\right)\right\}$$

so that enough air can be inducted for discharge from the aircraft to propel it by the mass reaction of the discharged air with a low enough velocity to reduce the said profile drag by boundary layer energization, means providing for the transference of fluid from the said opening to the said discharge opening by the means of blowing so that a fluid jet is dischargeable rearward to serve the dual purpose of reducing the drag by boundary layer energization and of creating a thrust to propel the aircraft.

27. In an aircraft, a wing having a divided upper surface to form a slot extending spanwise, the major part of the wing forward of the slot being substantially rigidly attached to the part rearward of the slot, a divided lower surface of the wing to form a slot, a means of blowing in communication with said slots to cause a flow therethrough, and means to control the flow differentially between the upper and lower surface slots in a coordinated relation.

28. In an aircraft associated with a relative wind a wing having a slot in its upper surface in the forward two-thirds of the chord, the major portion of the wing ahead of the slot being substantially rigidly attached to the portion aft of the slot, a perforated lower surface to form a spanwise slot directed rearward to discharge more along than normal to the surface, a principal means of propulsion comprising a means of blowing with a prime mover to actuate it in communication with the lower surface slot to cause a flow outward therethrough to reduce the resistance and create a thrust, means to direct a flow through the upper surface slot, and means to control the quantity of fluid flow differentially between the said upper and lower surface slots.

29. In an aircraft, a wing having a hollow interior, divided upper and lower surfaces of the wing to form in each a slot extending along the span in communication with the wing interior, at least one of the said slots having overlapping sides and being directed rearward for the discharge of fluid along the wing surface, means to divide the interior into compartments so that a wall is interposed between the slots, a propulsive means of blowing, means of communication between the compartments, means of communication between the means of blowing and said compartments to provide a flow through the slots with an outward and rearward direction at least through one slot to serve the dual purpose of reducing the resistance by energizing the boundary layer and of creating a thrust, and means to seal the compartment with the lower surface slot from that with the upper surface slot.

EDWARD A. STALKER.